(12) United States Patent
Je et al.

(10) Patent No.: US 8,192,508 B2
(45) Date of Patent: Jun. 5, 2012

(54) HIGH DIELECTRIC CONSTANT CERAMIC-POLYMER COMPOSITES, EMBEDDED CAPACITORS USING THE SAME, AND FABRICATION METHOD THEREOF

(75) Inventors: Hae June Je, Seoul (KR); Byung Kook Kim, Seoul (KR); Min Park, Seoul (KR); Dong Ho Lee, Ulsan (KR)

(73) Assignee: Korea Institute of Science and Technology (KR)

( * ) Notice: Subject to any disclaimer, the term of this patent is extended or adjusted under 35 U.S.C. 154(b) by 330 days.

(21) Appl. No.: 12/629,142

(22) Filed: Dec. 2, 2009

(65) Prior Publication Data

US 2011/0128670 A1 Jun. 2, 2011

(51) Int. Cl.
*C22B 1/16* (2006.01)

(52) U.S. Cl. ........ 23/313 R; 524/408; 524/434; 524/436
(58) Field of Classification Search ................ 23/313 R; 524/408, 434, 436
See application file for complete search history.

(56) References Cited

U.S. PATENT DOCUMENTS

| 6,544,651 B2 | 4/2003 | Wong et al. ................... 428/413 |
| 6,864,306 B2 | 3/2005 | Rao et al. ...................... 524/394 |
| 2006/0182973 A1 | 8/2006 | Lee et al. ...................... 428/413 |

*Primary Examiner* — Peter Szekely
(74) *Attorney, Agent, or Firm* — Ostrolenk Faber LLP

(57) ABSTRACT

Disclosed are ceramic-polymer composite consisting of aggregates of dielectric ceramic particles and polymer resin, and a fabrication method thereof, the method including aggregating dielectric ceramic particles to create aggregates, melting polymer resin in a solvent to prepare a polymer solution, dispersing the aggregates in the polymer solution to prepare a mixed solution, and hardening the mixed solution to obtain ceramic-polymer composites.

13 Claims, 3 Drawing Sheets

RCC (Resin-coated Cu Foil)

RCC (Resin-coated Cu Foil)

CCL (Cu-Clad Laminate)

HIGH DIELECTRIC CONSTANT CERAMIC-POLYMER COMPOSITES, EMBEDDED CAPACITORS USING THE SAME, AND FABRICATION METHOD THEREOF

TECHNICAL FIELD

The present invention relates to ceramic-polymer composites, and in particular, high dielectric constant ceramic-polymer composites, embedded capacitors using the same and a fabrication method thereof.

BACKGROUND ART

As a trend of multi-functionality and scaling-down of electronic devices is rapidly undergoing, a number of active components are further required and accordingly a greater number of passive components are needed which serve to help operations of the active components. In order to embed such a number of components onto a printed circuit board (PCB), a larger PCB is thus necessary; however, the size of the PCB is decreasing in response to the trend of scaling-down of portable electronic equipment.

To solve this problem, a method of embedding such components, which are mounted onto a PCB surface in the form of a surface mounted device, within the PCB has been proposed. This method can prevent inductive impedance (inductive capacity) due to a high frequency as well as miniaturizing of the PCB, and also have an effect on increase in product reliability due to decrease in soldered joints required for mounting components externally. Starting from developing a technique of embedding passive components, occupying 40% of the area of the PCB, a technique of embedding the active components, such as semiconductors and the like, is actively being developed in recent times.

Among several techniques of embedding passive components, including capacitor C/resistor R/inductor L, a study is actively conducted to embed the capacitor, occupying about 60% of the passive component. Materials for implementing the embedded capacitor may include conventional SMD chip, dielectric thin film, dielectric ceramic-polymer composite and the like.

The technique of embedding the SMD chip in the PCB has advantages of having high capacitance and superior product reliability, but has a disadvantage of having a complicated fabrication process. Similarly, the technique of embedding the dielectric thin film in the PCB also has an advantage of having high capacitance but a disadvantage of having high fabrication cost. In the meantime, in case of using the dielectric ceramic-polymer composites, the capacitance is disadvantageously low but the existing PCB fabricating process can advantageously be applied as it is. Accordingly, the embedding process can be simplified, thereby lowering the fabrication cost. Therefore, for employing the dielectric ceramic-polymer composites, it is very important to increase capacitance by increasing dielectric constant of the dielectric ceramic-polymer composites.

The dielectric ceramic-polymer composites are generally structured such that the dielectric ceramic particles (e.g., $BaTiO_3$ particles) are dispersed on polymer resin (e.g., epoxy resin).

In order for such ceramic-polymer composites to be used as embedded capacitors, they should have 1) high dielectric constant, 2) low dielectric loss, 3) low process temperature for superior compatibility with PCB, 4) low temperature coefficient of capacitance (TCC), 5) high breakdown voltage (BDV), 6) small leakage current and 7) high adhesiveness with copper electrodes.

Many researchers have been conducting studies on the increase in the dielectric constant of dielectric ceramic-polymer composites. The simplest method for increasing the dielectric constant of the ceramic-polymer composites is to increase the content of ceramic particles. However, as the content of ceramic particles is increased, the dielectric constant of the ceramic-polymer composites is increased accordingly, and the content of epoxy resin is relatively decreased, resulting in drastic decrease in adhesiveness with electrodes, which is another important characteristic of the ceramic-polymer composite. Hence, there is a limitation of the content of the ceramic particles added to the ceramic-polymer composites for the embedded capacitors.

Another method for increasing the dielectric constant of the ceramic-polymer composites is to increase the dielectric constant of epoxy resin. For instance, U.S. Pat. No. 6,544,651 has proposed that if an organometallic catalysis is added to epoxy resin, since the polarity of the epoxy resin is increased so as to increase the dielectric constant, the dielectric constant of the ceramic-polymer composites can be increased by using the same. However, as disclosed in US Patent Application No. 2006/0182973, if the polarity of the epoxy resin is increased, the dielectric constant is increased but a problem occurs that temperature stability at high temperature is drastically lowered. In other words, the ceramic-polymer composites fabricated by using the epoxy resin with high dielectric constant, having the polarity of the epoxy resin increased cannot be actually employed as embedded capacitors because the TCC value, as one of the characteristics that the embedded capacitors should have, moves out of the reference value (i.e., not within ±10%).

Another method has further been proposed to obtain much higher dielectric constant from ceramic-polymer composites in case of using conductive fillers for the polymer composites other than using ceramic fillers. As disclosed in U.S. Pat. No. 6,864,306, it has been observed that the dielectric constant of polymer composites using conductive filler, such as silver, gold, carbon black and the like, is epochally increased over 2000. However, it has been well known that the dielectric constant of polymer composites in which nano-unit conductive fillers are dispersed on epoxy resin is advantageously increased but electricity is caused to easily flow due to tunneling because the conductive fillers are closer to each other. In other words, the polymer composites fabricated by the conductive fillers cause a great leakage current and decrease of the BDV, thereby, bringing out a decisive problem that prohibits it from being used as embedded capacitors.

Consequently, polymer composites which are useable as the embedded capacitors are determined to be general ceramic-polymer composites which use, epoxy resin as a filter without its polarity adjusted and dielectric ceramic. However, it has been known to this date that the typical $BaTiO_3$-epoxy composites exhibit the dielectric constant of about 40-50 for 50% by weight of $BaTiO_3$ particles.

DISCLOSURE

Technical Solution

One of the objects of the present invention is to provide ceramic-polymer composites having high dielectric constant characteristic and a fabrication method thereof. Also, another object of the present invention is to provide a laminated plate in the form of a film, such as high capacitance resin coated with Cu foil (RCC) and Cu clad laminate (CCL) for embedded capacitors, using the ceramic-polymer composites with high dielectric constant.

Such objects of the present invention can be achieved by using ceramic-polymer composites consisting of aggregates of dielectric ceramic particles and polymer resin, and a fabrication method thereof, the method including aggregating dielectric ceramic particles to create aggregates, melting polymer resin in a solvent to prepare a polymer solution, dispersing the aggregates in the polymer solution to prepare a mixed solution, and hardening the mixed solution to obtain ceramic-polymer composites.

Effect

The present invention provides ceramic-polymer composites having high dielectric constant and low dielectric loss as well as superior adhesiveness with electrodes.

DESCRIPTION OF DRAWINGS

FIG. 4($b$) is a view schematically showing an embedded capacitor laminate in form of resin coated with Cu foil (RCC) piece that the composite was cast on a matte surface of a copper thin plate, fabricated by use of ceramic-polymer composites.

MODE FOR INVENTION

Figure 1:
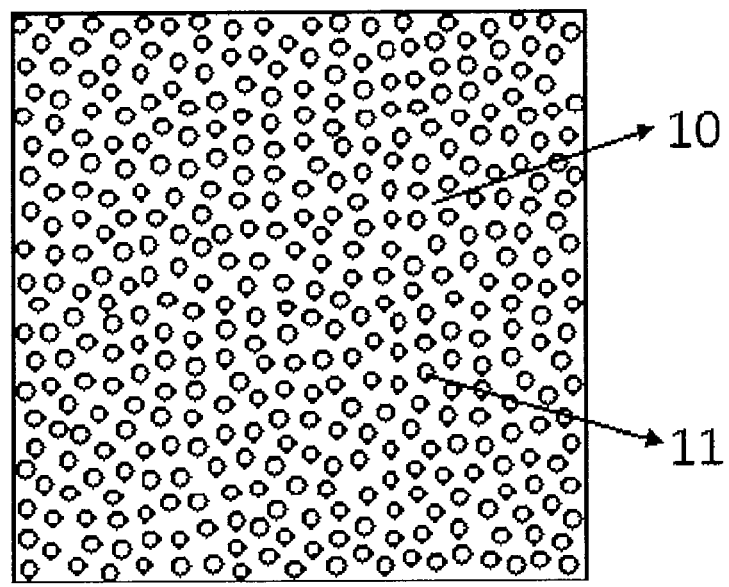
FIG. 1 is a schematic view of typical ceramic-polymer composites, which shows that dielectric particle fillers are well dispersed on a polymer resin matrix.

Constructions of ceramic-polymer composites, films and capacitors according to the present invention will now be described.

Ceramic-polymer composites according to the present invention may consist of aggregates of dielectric ceramic particles and polymer resin. The dielectric ceramic particle may be a ferroelectric particle, a paraelectric particle or a compound thereof. Alternatively, the dielectric ceramic particle may be $BaTiO_3$, $(Ba,Ca)TiO_3$, $(Ba,Sr)TiO_3$, $PbTiO_3$, $(Pb,Zr)TiO_3$, $Pb(Mn,Nb)O_3$, $Pb(Mn,Nb)O_3$—$PbTiO_3$, $SrTiO_3$, $Ta_2O_3$, $TiO_2$, $Al_2O_3$ or $SiO_2$. In particular, $BaTiO_3$ or $(Ba,Ca)TiO_3$ is preferably used for its high dielectric constant, and $SrTiO_3$ or $(Ba,Sr)TiO_3$ is preferably used for its high frequency.

Polymer resin may be either thermoplastic resin or thermosetting resin. In detail, the polymer resin may be a thermoplastic resin selected from a group consisting of polyethylene, polyamide, polyphenylene ether, polysulfone, polystyrene and liquid crystal polymer, a thermosetting resin selected from a group consisting of epoxy resin, polyimide, phenolic resin, BT resin, cyanate ether and benzocyclobutene, or a compound thereof. Epoxy resin may be preferably used for rigid PCB, and polyamide or liquid crystal polymer may be preferably used for a flexible PCB.

In the meantime, the ceramic-polymer composites may consist of 10-60% by weight of aggregates of dielectric ceramic particles and 40-90% by weight of polymer resin. If the content of dielectric ceramic particles is less than 10% by weight, the aggregation of particles is not well exhibited, and if it is more than 60% by weight, a problem of decrease in adhesiveness with electrodes occurs. If necessary, the content of aggregate may be selectable according to a desired objective. For example, the content of aggregates is reduced when the adhesiveness with electrodes is emphasized, and increased when high dielectric constant is required.

The size of each aggregate of dielectric ceramic particles may depend on the thickness of a ceramic-polymer composite piece. In other words, the maximum size of the aggregate of dielectric ceramic particles is the same as the thickness of the ceramic-polymer composite piece and a minimum size thereof is 1 μm. If the size of the aggregate of the dielectric ceramic particles is smaller than 1 μm, then the increase in the dielectric constant is not observed. Especially, if being used as a film, the size of the aggregate of the dielectric ceramic particles may preferably be 1-20 μm, more particularly, 1-15 μm.

Meanwhile, the present invention relates to a ceramic-polymer composite film containing the aforementioned constructed ceramic-polymer composites, and capacitors having the ceramic-polymer composite film. The capacitor may be embedded.

Hereinafter, description will be given of each method for fabricating ceramic-polymer composites, a ceramic-polymer composite film and a capacitor according to the present invention.

A method for fabricating ceramic-polymer composites according to the present invention may include aggregating dielectric ceramic particles to create aggregates, melting polymer resin in a solvent to prepare a polymer solution, dispersing the aggregates in the polymer solution to prepare a mixed solution, and hardening the mixed solution to obtain ceramic-polymer composites. The dielectric ceramic particles may be spontaneously aggregated or forcibly aggregated by thermal treatment. The spontaneous aggregation may cause a problem that the dielectric ceramic particles are separated away while being mixed with polymer. Hence, it is preferable to employ the forcible aggregation by which the particles are strongly aggregated by the thermal treatment.

Upon the thermal treatment, if the thermal treatment temperature is too high, then the dielectric ceramic particles are grown. If they excessively grow, the aggregation gets loosed during the composite fabrication. The dielectric ceramic particles may accordingly be easily separated individually. In spite of the growth of particles, the size of each particle contained in the aggregates should be less than 1 μm, more preferably, less than 0.5 μm.

The thermal treatment temperature may depend on the size of ceramic particle. If the size of the dielectric ceramic particle is in the range of 20-100 nm, the thermal treatment temperature may be in the range of 600-1100° C. If the size of the dielectric ceramic particle is in the range of 100-300 nm, the thermal treatment temperature may be in the range of 800-1200° C. If the size of the dielectric ceramic particle is in the range of 300-500 nm, the thermal treatment temperature may be in the range of 900-1300° C. As the dielectric ceramic particle becomes smaller in size, sinterbility is improved, which allows better aggregation, thereby increasing a cohesive force. However, if the size of the dielectric ceramic particle is less than 20 nm, the ferroelectric particle is changed into the paraelectric particle in view of its characteristic, whereby the dielectric constant of the particle is drastically decreased. Hence, the size of the dielectric ceramic particle may preferably be more than 20 nm.

Meanwhile, the dielectric ceramic particle in the method for fabricating ceramic-polymer composites according to the present invention may be a ferroelectric particle, a paraelectric particle or a compound thereof. Alternatively, the dielectric ceramic particle may be $BaTiO_3$, $(Ba,Ca)TiO_3$, $(Ba,Sr)TiO_3$, $PbTiO_3$, $(Pb,Zr)TiO_3$, $Pb(Mn,Nb)O_3$, $Pb(Mn,Nb)O_3$—$PbTiO_3$, $SrTiO_3$, $Ta_2O_3$, $TiO_2$, $Al_2O_3$ or $SiO_2$. The polymer resin may be a thermoplastic resin selected from a group consisting of polyethylene, polyamide, polyphenylene ether, polysulfone, polystyrene and liquid crystal polymer, a thermosetting resin selected from a group consisting of epoxy resin, polyimide, phenolic resin, BT resin, cyanate ether and benzocyclobutene, or a compound thereof.

The ceramic-polymer composites fabricated according to the present invention may consist of 10-60% by weight of aggregates of dielectric ceramic particles and 40-90% by weight of polymer resin. In general, the ceramic-polymer composites may be fabricated by a wet process of melting epoxy resin in solvent and thereafter adding ceramic particle fillers to the solution. In fabricating the ceramic-polymer composites according to the present invention employing the aggregates as fillers, if more than 30% by weight of the aggregates are used, a lot of foam may be generated within a solvent-dried composite thick film. Hence, upon more than 30% by weight of the aggregates being used, a foam removal process may preferably be executed. A roll pressing process having consecutive operations allowed may be preferable in consideration of mass-production. In other words, the ceramic-polymer composite thick film fabricated by tape casing is dried to remove solvent and pressed by a roll so as to create the thick film. Here, it may be necessary to appropriately increase the temperature of the roll such that the polymer resin can have liquidity. The hot roll pressing process can improve the uniformity of the thickness of the composite thick film as well as removing the foam, thereby decreasing capacitance deviation of the ceramic-polymer composites.

The size of the aggregate in the method for fabricating the ceramic-polymer composites according to the present invention may be more than 1 μm and less than the thickness of the ceramic-polymer composite. Also, the size of the aggregate in the method for fabricating the ceramic-polymer composite film may be 1~15 μm, and the size of the dielectric ceramic particle may preferably be less than 0.5 μm.

Hereinafter, description will be given of comparison between the construction of the typical ceramic-polymer composites according to related art and the construction of the ceramic-polymer composites according to the present invention with reference to the drawings.

Figure 2:
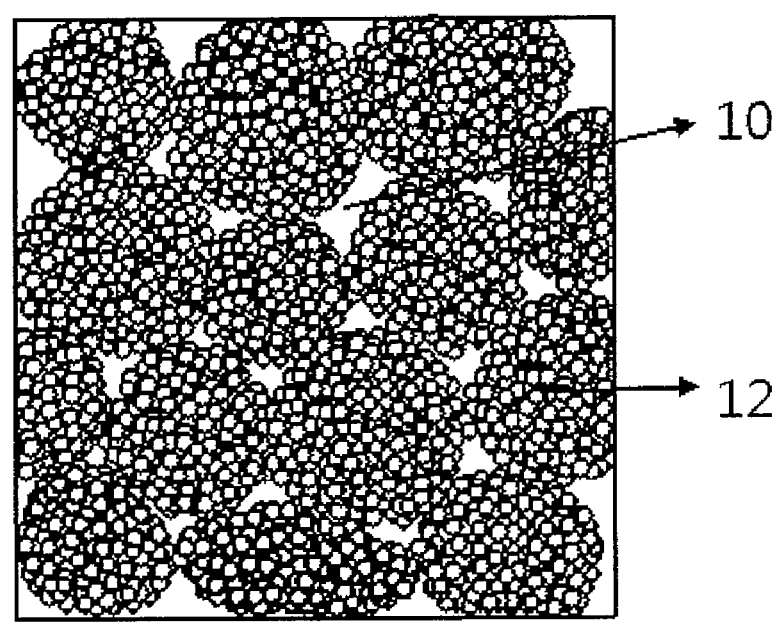
FIG. 2 is a schematic view of ceramic-polymer composites prepared according to the present invention, which shows that each of the aggregates, having a number of dielectric ceramic particles connected thereto through thermal treatment, are mixed on a polymer resin matrix as fillers.

As shown in FIG. 1, the typical ceramic-polymer composites are structured such that ceramic particle fillers 11 are dispersed on a polymer matrix 10, that is, the polymer is likely coated on the surface of each ceramic particle filler 11 so that each ceramic particle filler 11 is separated from one another. In this case, the polymer may serve as an insulator, thereby lowering the dielectric constant of the ceramic-polymer composite. In contract, for the ceramic-polymer composite according to the present invention, as shown in FIG. 2, a lump that the ceramic particles are aggregated, namely, aggregates 12 of the dielectric ceramic particles are used as fillers to be mixed with polymers, thereby fabricating the composites. The dielectric ceramic particles are connected with each other within the aggregate of the dielectric ceramic particles, thus to have a structure of partially parallel connectivity, resulting in increase in the dielectric constant of the composites.

EXAMPLES

Hereinafter, detailed description will be given of examples and comparison examples of ceramic-polymer composites with high dielectric constant according to the present invention. However, the present invention may not be limited to those examples and comparison examples.

Examples 1 to 3

$BaTiO_3$ as a representative high dielectric constant ceramic particle and epoxy resin as a representative thermosetting resin were selected to fabricate ceramic-polymer composites.

Figure 3:
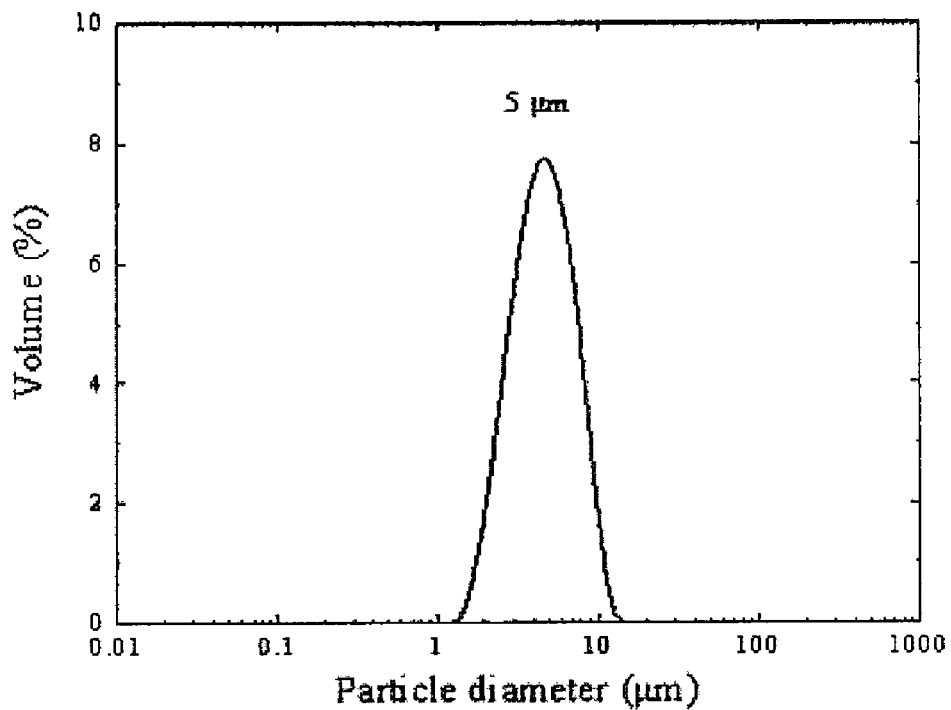
FIG. 3 is a graph showing an example of distribution size of aggregate fillers of a number of dielectric ceramic particles prepared according to the present invention.

$BaTiO_3$ aggregates were prepared as follows. $BaTiO_3$ dielectric ceramic particle used had a particle size of 100 nm on average. Typically, $BaTiO_3$ dielectric ceramic particles each having the size of 100 nm on average were spontaneously aggregated with a size of several tens to several hundreds nanometers. These particles were thermally treated for 1 hour at a temperature of 1000° C. under an air atmosphere so as to be strongly aggregated. The aggregates aggregated by the thermal treatment in various sizes were mixed with methanol. The mixture was subjected to a ball milling for 2 hours. Accordingly, aggregates with a desired size could be selected by precipitation of the mixed solution of the milled aggregates and the methanol. The size distribution of $BaTiO_3$ aggregates fabricated through the above method was shown in FIG. 3. The $BaTiO_3$ aggregates used in Examples 1 to 3 had a size of 5 μm on average, and the size distribution is in the range of 1-12 μm.

The epoxy resin used in the present invention was used by mixing phosphorous epoxy and phenolite as a curing agent in the ratio of 10:3. 2-ME(2-methoxyethanol) was used as a solvent capable of melting the phosphorous epoxy and the phenolite. A dispersing agent for improving dispersibility of filters and a leveling agent for removing damage on the surface of composite thick film were added for use.

Figure 4A:
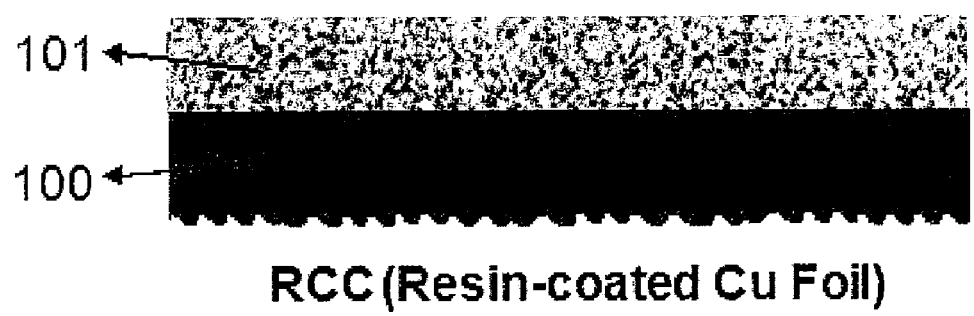
FIG. 4($a$) is a view schematically showing an embedded capacitor laminate in form of resin coated with Cu foil (RCC) piece that the composite was cast on a glossy surface of a copper thin plate, fabricated by use of ceramic-polymer composites.
Figure 4B:
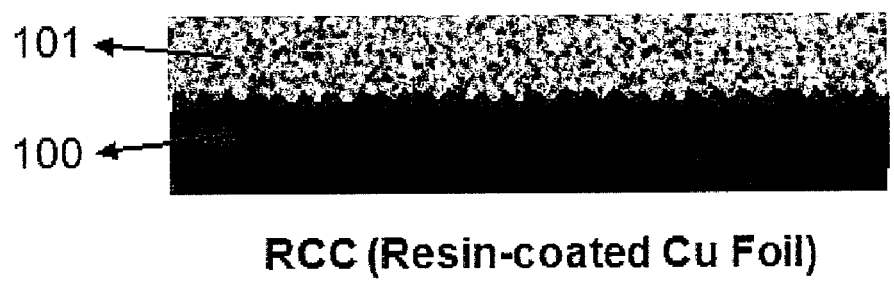

Examples 1 to 3 were executed by differing the percentage by weight of $BaTiO_3$ aggregate fillers from the percentage by weight of epoxy resin. The mixing ratio was adjusted such that $BaTiO_3$ aggregate filler and epoxy resin were mixed in the volume ratio of 40:60 (Example 1), 45:55 (Example 2) and 50:50 (Example 3). Fillers were dispersed and simultaneously the solvent was evaporated while stirring the mixed solution on a plate heated up to 60° C. Upon the compound slurry reaching an appropriate viscosity, $BaTiO_3$-epoxy composite film was fabricated by use of tape caster. Here, as shown in FIG. 4(a) and FIG. 4(b), a copper thin plate was used as a substrate to form a lower electrode 100. Under this state, the solvent was completely evaporated at a temperature of 70° C., thereby fabricating a dried $BaTiO_3$-epoxy composite film with 15 μm thickness. Fabricated in this manner, the $BaTiO_3$-epoxy composite film contained foams therein, accordingly the same was compressed through a roll pressing process, thereby removing the foams. Here, the roll was heated up to 100° C. such that the epoxy resin could have liquidity at the time of the roll pressing. Accordingly, the $BaTiO_3$ aggregate fillers were allowed to have a precise structure when realigned. The roll-pressed $BaTiO_3$-epoxy composite film was hardened for 1 hour at a temperature of 180° C., thereby fabricating a piece of BaTiO$_3$-epoxy composite film 101 as shown in FIG. 4(*a*) and FIG. 4(*b*). The hardened composite piece was 10 μm in thickness.

In order to calculate an accurate dielectric constant of the BaTiO$_3$-epoxy composite film, the thickness of the composite should be accurately measured. As shown in FIG. 4(*a*), a resin-coated with Cu foil (RCC) piece that the composite was cast on a glossy surface of a copper thin plate was made. The RCC composite actually used for an embedded capacitor was cast on a matte surface of Cu foil, as shown in FIG. 4(*b*), to intensify the adhesive force with Cu electrode.

Capacitance and dielectric loss of the fabricated BaTiO$_3$-epoxy composite film were measured at 1 MHz frequency by use of an LCR meter, and the dielectric constant thereof was calculated based upon the measured capacitance and thickness.

Comparison Examples 1 to 3

All the raw materials and processes are the same as those in Examples 1 to 3, excluding that typical BaTiO$_3$ particle fillers were used other than the aggregate fillers. Typically 0.5 μm sized BaTiO$_3$ particles were used as fillers in Comparison Examples 1 to 3. Therefore, BaTiO$_3$-epoxy composite film in a structure, as shown in FIG. 1, in which 0.5 μm sized BaTiO$_3$ particles were uniformly dispersed on the epoxy resin matrix, was fabricated. Similar to Examples 1 to 3, BATiO$_3$ particle fillers and epoxy resin were mixed in volume ratio of 40:60 (Comparison Example 1), 45:55 (Comparison Example 2) and 50:50 (Comparison Example 3), and the fabricated composite also had the same thickness of 10 μm.

Table 1 shows the comparison results of the dielectric constant characteristic and the dielectric loss characteristic respectively from Examples 1 to 3 and Comparison Examples 1 to 3, measured at 1 MHz frequency. It was exhibited that the dielectric constants from Example 1 to 3 were increased about twice higher than the dielectric constants from Comparison Examples 1 to 3 and no difference was observed in the dielectric loss. Consequently, in spite of using the same amount of BaTiO$_3$ particle fillers in the BaTiO$_3$-epoxy composite, it could be noticed that the dielectric constant of the composite fabricated by use of the aggregate fillers, in which BaTiO$_3$ particles were connected to one another, as in the present invention, was about twice higher than the dielectric constant of the composite, in which BaTiO$_3$ particles were dispersed on the epoxy resin so as to be separated.

Such results were observed in the paraelectric particle as well as the ferroelectric particle. Therefore, in the ceramic-polymer composites for embedded capacitors over GHz frequency band, for example, if SrTiO$_3$ aggregates with superior high frequency characteristics are used as fillers and polyimide resin was used as a polymer, the same effect can be obtained.

TABLE 1

| Example No. | Filler Volume Fraction (Vol %) | Epoxy Resin Volume Fraction (Vol %) | Dielectric Constant (@ 1 MHz) | Dielectric Loss (@ 1 MHz) |
| --- | --- | --- | --- | --- |
| Ex. 1 | 40 | 60 | 66 | 0.016 |
| Ex. 2 | 45 | 55 | 82 | 0.016 |
| Ex. 3 | 50 | 50 | 95 | 0.016 |
| Comp. Ex. 1 | 40 | 60 | 32 | 0.017 |
| Comp. Ex. 2 | 45 | 55 | 40 | 0.017 |
| Comp. Ex. 3 | 50 | 50 | 48 | 0.017 |

Example 4 and Comparison Example 4

Figure 5:
FIG. 5 is a view schematically showing an embedded capacitor laminate in form of Cu clad laminate (CCL) fabricated by use of ceramic-polymer composites.

Example 4 was conducted to measure various properties of BaTiO$_3$-epoxy composite prepared under the same condition to in Example 3 by fabricating CCL type laminated plate in the same structure as in FIG. 5, so as to determine whether the BaTiO$_3$-epoxy composites were useable as embedded capacitors. Also, Comparison Example 4 was conducted to measure various properties of BaTiO$_3$-epoxy composite prepared under the same condition to in Comparison Example 3 by fabricating CCL type laminated plate in the same structure as in FIG. 5, so as to compare with those of Example 4. In other words, Example 4 and Comparison Example 4 were executed in the same condition that BaTiO$_3$ particle filler and epoxy resin were mixed in the volume ratio of 50:50 as the CCL type laminated plate of the BaTiO$_3$-epoxy composite, excluding that the aggregate fillers were used in Example 4 while typical dispersive particles were used as fillers in Comparison Example 4. The CCL type laminated plate and the RRC type laminated plate in the structure shown in FIG. 4(*b*) are all the same excluding that the matte surface of Cu foil is used to form upper electrode 102/lower electrode 100 by a roll pressing. The BaTiO$_3$-epoxy composite was fabricated with an average thickness of 10 μm.

Table 2 shows comparison results of the various properties of the CCL type BaTiO$_3$-epoxy composite film fabricated from Example 4 and those of the CCL type BaTiO$_3$-epoxy composite film fabricated from Comparison Example 4. Firstly, capacitance density was 7 nF/cm$^2$ in Example 4, namely, it was increased twice higher than 3.5 nF/cm$^2$ in Comparison Example 4, which results from the twice increased dielectric constant. There is no great difference in the dielectric loss. As one of the conditions to be used as the embedded capacitor, TCC was 9% in Example 4 and 3% in Comparison Example 4, both meeting a reference value, namely, the range within 10%. As a result of measuring peel strengths to compare the adhesiveness with Cu electrode, they were the same as 0.9 kN/m both in Example 4 and Comparison Example 4. It is determined that the result would be the same content of BaTiO$_3$ particle fillers. Thermal test is executed to check the occurrence of capacitance change after floating the composite piece in a solder bath at 288° C. for 20 seconds on the basis of 10-time tolerance. It was observed both in Example 4 and Comparison Example 4 that the composite film was endured more than 10 times during the thermal test. Also, in view of the other electric properties, Example 4 exhibited a slightly lower specific resistivity than that of Comparison Example 4 and accordingly the breakdown voltage became slightly lower and the leakage current was slightly increased, compared to Comparison Example 4. However, the value level shown in Table 2 may have no problem in actually using 10 μm thick BaTiO$_3$-epoxy composite film piece as the embedded capacitor. Consequently, it was confirmed that the capacitance in Example 4 employing BaTiO$_3$ aggregates as fillers was increased by twice more than Comparison Example 4 employing the same amount of typical particles as fillers and the peel strength was similar to each other.

Hence, the ceramic-polymer composites, using the ceramic aggregates as fillers, exhibited the dielectric constant increased by twice more than the ceramic-polymer composites using the same amount of typical dispersive particles as filers, which leads to twice the increase in the capacitance density. This is the core of the present invention.

TABLE 2

| Properties | Condition | Ex. 4 | Comp. Ex. 4 |
|---|---|---|---|
| Filler Volume Fraction (Vol %) | | 50 | 50 |
| Epoxy Resin Volume Fraction (Vol %) | | 50 | 50 |
| Composite Thickness | | 10 | 10 |
| Capacitance Density (nF/cm$^2$) | @ 1 MHz | 7 | 3.5 |
| Dielectric Loss | @ 1 MHz | 0.016 | 0.017 |
| Temperature Coefficient of Capacitance (%) | −20° C.~120° C. | 9 | 3 |
| Peel Strength (kN/m) | ½ oz Cu Foil | 0.9 | 0.9 |
| Thermal Test (Times) | @ 288° C.-20 sec | >10 | >10 |
| Specific resistivity (Ω-cm) | | $3 \times 10^9$ | $5 \times 10^{10}$ |
| Break Down Voltage (kV/mm) | | 120 | 150 |
| Leakage Current (A/cm$^2$) | @ 1 kV/mm | $2 \times 10^{-7}$ | $8 \times 10^{-8}$ |

The invention claimed is:

1. A method for fabricating ceramic-polymer composites comprising:
 aggregating dielectric ceramic particles to create aggregates;
 melting polymer resin in a solvent to prepare a polymer solution;
 dispersing the aggregates in the polymer solution to prepare a mixed solution; and
 hardening the mixed solution to obtain ceramic-polymer composites.

2. The method of claim 1, wherein the dielectric ceramic particle is a ferroelectric particle, a paraelectric particle or a compound thereof.

3. The method of claim 1, wherein the dielectric ceramic particle is $BaTiO_3$, $(Ba,Ca)TiO_3$, $(Ba,Sr)TiO_3$, $PbTiO_3$, $(Pb, Zr)TiO_3$, $Pb(Mn,Nb)O_3$, $Pb(Mn,Nb)O_3$—$PbTiO_3$, $SrTiO_3$, $Ta_2O_3$, $TiO_2$, $Al_2O_3$ or $SiO_2$.

4. The method of claim 1, wherein the polymer resin is one of a thermoplastic resin selected from a group consisting of polyethylene, polyamide, polyphenylene ether, polysulfone, polystyrene and liquid crystal polymer, a thermosetting resin selected from a group consisting of epoxy resin, polyimide, phenolic resin, BT resin, cyanate ether and benzocyclobutene, or a compound thereof.

5. The method of claim 1, wherein the ceramic-polymer composite consists of 10-60% by weight of aggregates of dielectric ceramic particles and 40-90% by weight of polymer resin.

6. The method of claim 1, wherein the size of each dielectric ceramic particle is in the range of 20 nm to 500 nm.

7. The method of claim 1, wherein the size of the aggregate is more than 1 μm, and less than a thickness of the ceramic-polymer composite.

8. The method of claim 1, wherein the size of the aggregate is in the range of 1 μm to 15 μm.

9. The method of claim 1, wherein the aggregation is spontaneously achieved between particles.

10. The method of claim 1, wherein the aggregation is achieved by thermal treatment.

11. The method of claim 10, wherein the size of the dielectric ceramic particle is in the range of 20-100 nm, and a thermal treatment temperature is in the range of 600-1100° C.

12. The method of claim 10, wherein the size of the dielectric ceramic particle is in the range of 100-300 nm and a thermal treatment temperature is in the range of 800-1200° C.

13. The method of claim 10, wherein the size of the dielectric ceramic particle is in the range of 300-500 nm and a thermal treatment temperature is in the range of 900-1300° C.

* * * * *